US008777472B2

(12) United States Patent
Okada

(10) Patent No.: US 8,777,472 B2
(45) Date of Patent: Jul. 15, 2014

(54) IMAGE FORMING APPARATUS

(75) Inventor: Takehiko Okada, Osaka (JP)

(73) Assignee: Kyocera Mita Corporation (JP)

( * ) Notice: Subject to any disclaimer, the term of this patent is extended or adjusted under 35 U.S.C. 154(b) by 100 days.

(21) Appl. No.: 13/397,276

(22) Filed: Feb. 15, 2012

(65) Prior Publication Data

US 2012/0206936 A1 Aug. 16, 2012

(30) Foreign Application Priority Data

Feb. 16, 2011 (JP) ................................ 2011-031104

(51) Int. Cl.
*F21V 7/04* (2006.01)
*G02B 6/00* (2006.01)
*G09F 13/00* (2006.01)

(52) U.S. Cl.
USPC ........... 362/602; 362/608; 362/610; 362/621; 362/551

(58) Field of Classification Search
USPC ......... 362/602, 608–610, 621, 623, 625, 626, 362/98, 99, 551, 555, 558, 559, 560; 355/67; 358/484
See application file for complete search history.

(56) References Cited

U.S. PATENT DOCUMENTS 3,547,534 A * 12/1970 Akiyama et al. .............. 399/144
5,177,535 A * 1/1993 Watanabe ..................... 399/151
5,813,748 A * 9/1998 Maxymych ................... 362/154
6,111,207 A * 8/2000 Arterberry et al. ........... 200/5 R
6,320,650 B1 * 11/2001 Fredlund et al. ................ 355/75
6,388,774 B1 5/2002 Kurata et al.
6,573,950 B1 6/2003 Hirata et al.
6,575,584 B1 * 6/2003 Habraken ..................... 362/609
6,850,767 B1 * 2/2005 Maxymych ................... 455/461
7,011,442 B2 * 3/2006 Okuwaki et al. .............. 362/626
7,125,120 B2 * 10/2006 Aruga ............................ 353/20
7,163,307 B1 * 1/2007 Clark et al. ..................... 362/99
7,182,497 B2 * 2/2007 Lee et al. ...................... 362/555
7,194,185 B2 * 3/2007 Watanabe ..................... 385/146
7,308,186 B2 * 12/2007 Kaczmarek ................... 385/147
7,331,694 B2 * 2/2008 Lee et al. ...................... 362/335
8,520,270 B2 * 8/2013 Sawada et al. ................ 358/474

(Continued)

FOREIGN PATENT DOCUMENTS

DE 102005040990 3/2007
JP 03035260 2/1991

(Continued)

*Primary Examiner* — Peggy Neils
*Assistant Examiner* — Erin Kryukova
(74) *Attorney, Agent, or Firm* — Gerald E. Hespos; Michael J. Porco; Matthew T. Hespos

(57) ABSTRACT

An image forming apparatus 1 is provided with an apparatus main body 2 for performing a predetermined process on a sheet, a cover 34 openable and closable relative to the apparatus main body 2, a light emitting unit 51 provided in the apparatus main body 2 and including an emission source 511 for generating light, a control board 512 for controlling the emission source 511 and causing it to generate the light and wiring 513 electrically connected to the control board 512, and a display member 52 provided in the cover 34, arranged to face the emission source 511 and including an incident portion 521 on which the light is incident, an output portion 522 for outputting the light to the outside and a light guide portion 523 for guiding the light from the incident portion 521 to the output portion 522.

8 Claims, 9 Drawing Sheets

(56) References Cited

U.S. PATENT DOCUMENTS

| | | | | |
|---|---|---|---|---|
| 2001/0003504 | A1* | 6/2001 | Ishihara et al. | 362/31 |
| 2003/0197812 | A1 | 10/2003 | Hirata et al. | |
| 2003/0202127 | A1 | 10/2003 | Hirata et al. | |
| 2005/0088576 | A1 | 4/2005 | Hirata et al. | |
| 2006/0280422 | A1 | 12/2006 | Kaczmarek | |
| 2009/0262553 | A1 | 10/2009 | Kim | |
| 2010/0296314 | A1* | 11/2010 | Segawa | 362/616 |

FOREIGN PATENT DOCUMENTS

| | | |
|---|---|---|
| JP | 6-106817 | 4/1994 |
| JP | 10-250185 | 9/1998 |
| JP | 11-136419 | 5/1999 |
| JP | 2002-156874 | 5/2002 |
| JP | 2008-103110 | 5/2008 |
| JP | 2008-276976 | 11/2008 |
| JP | 2008-310008 | 12/2008 |

* cited by examiner

BACK
RIGHT
LEFT
FRONT
3
31
33
311
30
30H
50
522
(52)
342a
342
302
32
34
341
301

BACK
RIGHT
LEFT
FRONT
311
P
30H
311
320
32
321
302
322
323
343
34
321A
301
303
303a
532
53
511
532

IMAGE FORMING APPARATUS

BACKGROUND

The present disclosure relates to an image forming apparatus, particularly to a display device for displaying state information of the image forming apparatus.

In a conventional image forming apparatus, various pieces of state information are generated according to an image forming process for forming an image on a sheet. The state information includes, for example, information notifying toner shortage, jam occurrence and sheet shortage. An LED (light-emitting diode) is often used as a means for notifying such state information to a user in the display device.

The display device generally includes a light emitting unit and a display unit. The light emitting unit includes an LED as an emission source, a control board for controlling the LED based on detection by a detector for detecting the state information of the image forming apparatus and generating light, and wiring for connecting the control board and the detector. The display unit has a display area for notifying the state information by the light of the LED.

The display device is often provided on an outer cover of an apparatus main body of the image forming apparatus or on an outer cover of an automatic document feeder. The outer cover is openably and closably mounted for a jam processing and the like. Thus, when the outer cover is closed after the jam processing or the like is completed, the wiring connecting the control board and the detector may be caught by the outer cover. If the wiring is repeatedly caught, it is damaged and the LED cannot be properly controlled. As a result, the user cannot recognize the state information.

Accordingly, in view of the above situation, an object of the present disclosure is to provide an image forming apparatus capable of preventing wiring from being caught as a cover is opened and closed.

SUMMARY

In order to achieve the above object, the present disclosure is directed to an image forming apparatus, comprising: an apparatus main body (2) for performing a predetermined process on a sheet; a cover (34) openable and closable relative to the apparatus main body; a light emitting unit (51) provided in the apparatus main body (2) and including an emission source (511) for generating light, a control board (512) for controlling the emission source and causing it to generate the light and wiring (513) electrically connected to the control board; and a display member (52) provided in the cover (34), arranged to face the emission source (511) and including an incident portion (521) on which the light is incident, an output portion (522) for outputting the light to the outside and a light guide portion (523) for guiding the light from the incident portion to the output portion.

According to the image forming apparatus of the present disclosure, the light emitting unit is provided in the apparatus main body and the display member is provided in the cover openable and closable relative to the apparatus main body. That is, the control board of the light emitting unit is provided in the apparatus main body. Thus, the wiring electrically connected to the control board is not arranged between the apparatus main body and the cover. In this way, even if a problem occurs in the apparatus main body and the cover is opened and closed to solve this problem, it is prevented that the wiring is caught by the cover, consequently that the wiring is damaged. Therefore, the emission source is appropriately controlled and light of the emission source is output to the outside. As a result, the display member can fulfill the display function.

DETAILED DESCRIPTION

Figure 1:
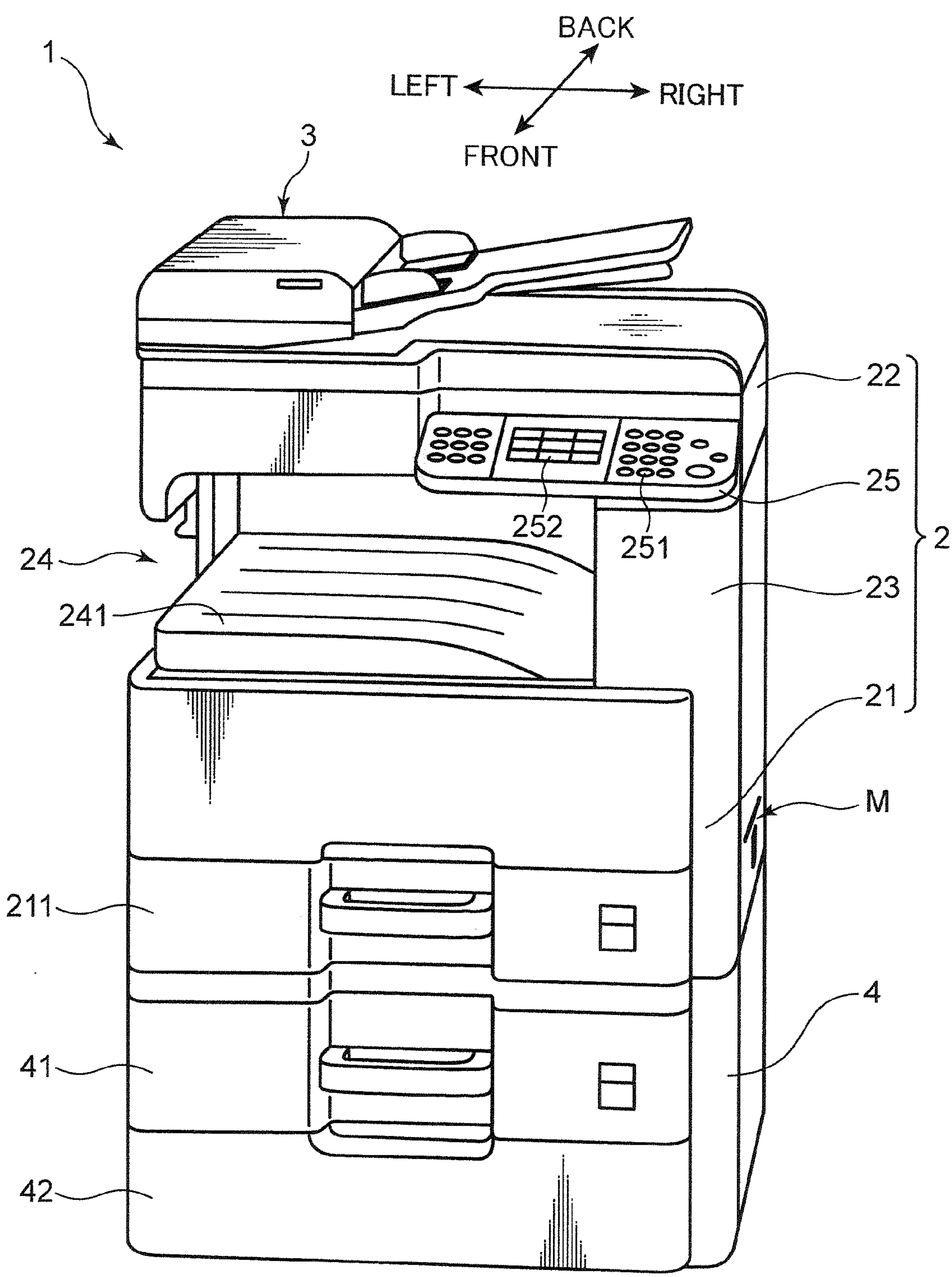
FIG. 1 is a perspective view showing the external appearance of an image forming apparatus according to one embodiment of the present disclosure.
Figure 2:
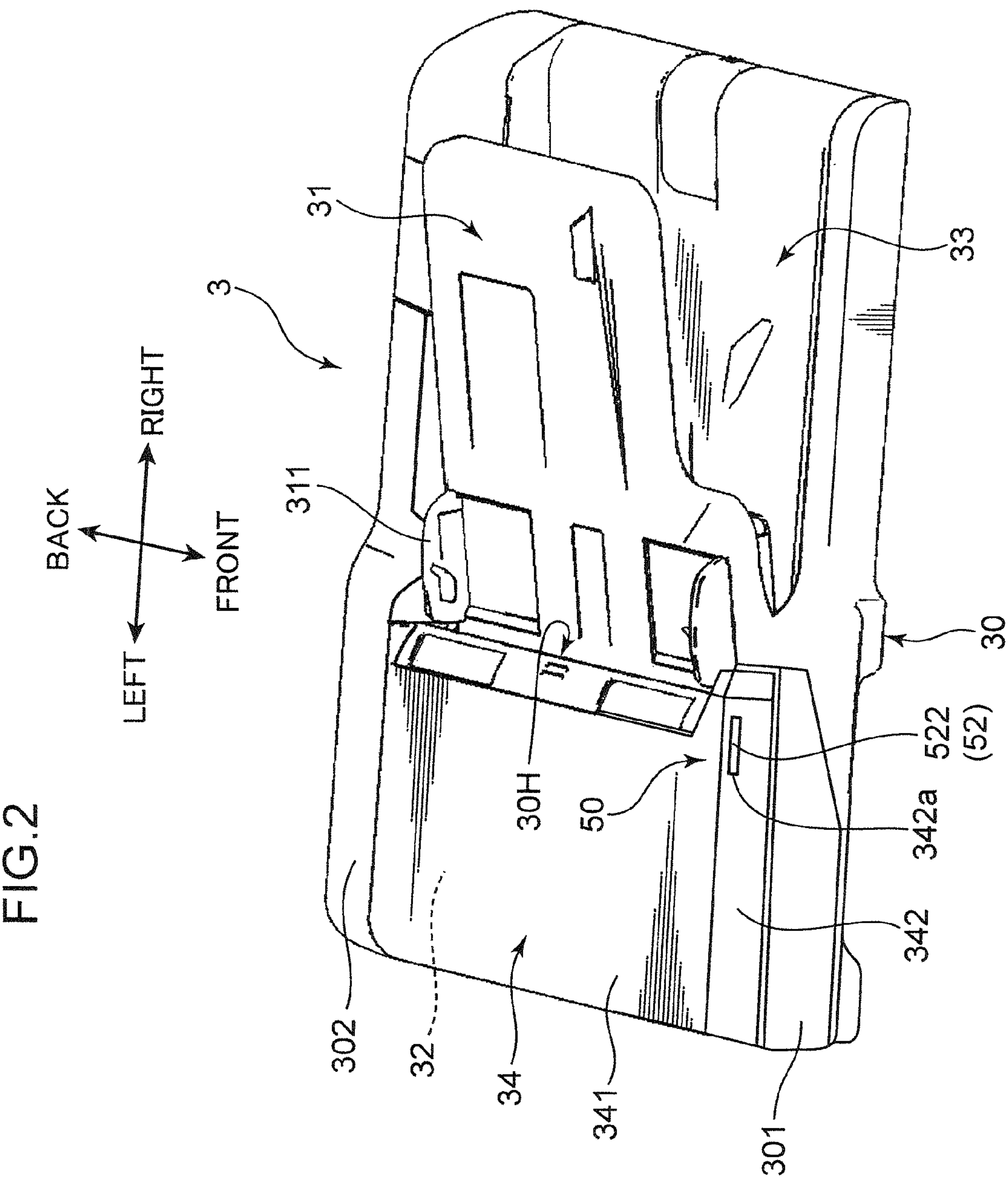
FIG. 2 is a perspective view showing the external appearance of an automatic document feeder.
Figure 3:
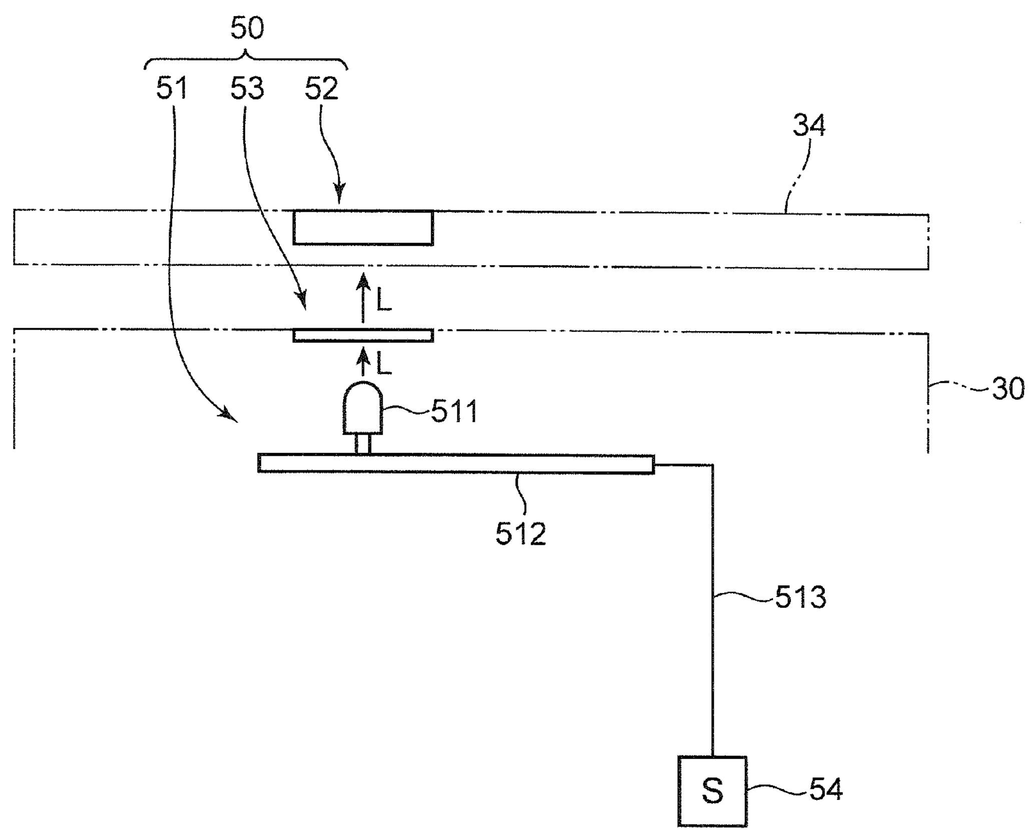
FIG. 3 is a diagram conceptually showing the construction of a display device of the automatic document feeder.

Hereinafter, an embodiment of the present disclosure is described in detail with reference to the drawings. FIG. 1 is a perspective view showing the external appearance of an image forming apparatus 1 according to one embodiment of the present disclosure, FIG. 2 is a perspective view showing the external appearance of an automatic document feeder 3 and FIG. 3 is a diagram conceptually showing the construction of a display device of the automatic document feeder 3. Although an internal discharge type copier is illustrated as the image forming apparatus 1 here, the image forming apparatus 1 may be a printer, a facsimile machine or a complex machine provided with these functions.

The image forming apparatus 1 has a substantially rectangular parallelepipedic housing structure and includes an apparatus main body 2 with an internal space (internal discharge portion 24) and a main housing 30, and an extension sheet feeder unit 4 assembled below the apparatus main body 2.

The apparatus main body 2 performs an image forming process on a sheet. The apparatus main body 2 includes a substantially rectangular parallelepipedic lower housing 21, a substantially rectangular parallelepipedic upper housing 22 arranged above the lower housing 21, and a coupling housing 23 coupling the lower housing 21 and the upper housing 22. Various devices for image formation are housed in the lower housing 21, and various devices for optically reading a document image are housed in the upper housing 22. An internal space enclosed by the lower housing 21, the upper housing 22 and the coupling housing 23 serves as the internal discharge portion 24 capable of storing a sheet after image formation. The coupling housing 23 is arranged at a side of the right surface of the apparatus main body 2 and provided with an unillustrated discharge opening for discharging a sheet to the internal discharge portion 24.

The internal space utilized as the internal discharge portion 24 is exposed to the outside at the front surface and the left surface of the apparatus main body 2. A user can take out a sheet after image formation from the internal discharge portion 24 by inserting his hand through these exposed parts. A bottom surface 241 of the internal space is defined by the upper surface of the lower housing 21, and discharged sheets are stacked thereon.

An operation panel unit 25 is provided to project from the front surface of the upper housing 22. The operation panel unit 25 is provided with operation keys 251 including a numerical keypad and a start key, an LCD touch panel 252, etc. and receives input of various operation instructions from the user. The user can input the number of sheets to be printed, print density, etc. by means of the operation panel unit 25.

A sheet cassette 211 for storing recording sheets on which an image forming process is to be performed is mounted in the lower housing 21. The extension sheet feeder unit 4 also includes sheet cassettes 41, 42 for storing recording sheets on which the image forming process is to be performed. These sheet cassettes 211, 41 and 42 are provided for automatic sheet feeding and a large number of recording sheets can be stored according to sizes. Further, the sheet cassettes 211, 41 and 42 can be withdrawn forward from the front surface of the lower housing 21 or the extension sheet feeder unit 4.

A manual feed tray M enabling the user to manually feed a sheet is mounted on the right surface of the apparatus main body 2. A recording sheet is manually placed on the manual feed tray M. The user opens the manual feed tray M and places a recording sheet thereon in the case of manually feeding the sheet.

The automatic document feeder 3 is rotatably mounted on the rear side of the upper surface of the apparatus main body 2. The automatic document feeder 3 automatically feeds a document sheet to be copied toward a predetermined document reading position (position where a so-called contact glass is mounted) in the apparatus main body 2. On the other hand, when the user manually places a document sheet on a predetermined document reading position, the automatic document feeder 3 is opened upward.

Next, the internal structure of the apparatus main body 2 is briefly described. Toner containers, an intermediate transfer belt, an image forming station, an exposure unit and the above sheet cassette 211 are housed in the lower housing 21. The image forming station includes four image forming units for forming toner images of yellow (Y), magenta (M), cyan (C) and black (K) to form a full-color toner image. Each image forming unit includes a photoconductive drum, and a charger, a developing device, a primary transfer roller and a cleaner arranged around the photoconductive drum.

The charger uniformly charges the circumferential surface of the photoconductive drum. The exposure unit irradiates the circumferential surface of the photoconductive drum after charging with light based on image data of a document image to form an electrostatic latent image on the circumferential surface. The developing device supplies toner to the circumferential surface of the photoconductive drum to develop the electrostatic latent image formed on the photoconductive drum. The primary transfer roller sandwiches the intermediate transfer belt together with the photoconductive drum to form a nip portion, and primarily transfers a toner image on the photoconductive drum to the intermediate transfer belt. The cleaner cleans the circumferential surface of the photoconductive drum after the transfer of the toner image. The toner containers supply toners of the respective colors to the developing devices corresponding to the respective YMCK colors.

The toner image primarily transferred onto the intermediate transfer belt is secondarily transferred to a recording sheet supplied from the sheet cassette 211 by a secondary transfer roller. Then, the toner image on the recording sheet is heated and fixed to the recording sheet by a fixing device in the coupling housing 23 and the recording sheet is discharged to the internal discharge portion 24.

With reference to FIG. 2, the automatic document feeder 3 includes the main housing 30 (part of the apparatus main body 2), a document feed tray 31, a document conveying unit 32 and a document discharge tray 33. The main housing 30 is a housing for housing various mechanisms provided in the automatic document feeder 3 and includes a front wall portion 301 and a rear wall portion 302 raised upward at the left side where the document conveying unit 32 is housed and a substantially flat low-level part on the right side.

The document feed tray 31 is a tray on which a document sheet to be fed to the image reading position is to be placed, and attached to the main housing 30 in such a manner as to extend from a feed opening 30H of the main housing 30. The document feed tray 31 includes a pair of cursors 311 for aligning the width of a placed document sheet.

The document conveying unit 32 includes a conveyance path and a conveying mechanism for conveying a document sheet on the document feed tray 31 to the document discharge tray 33 via the image reading position. The document conveying unit 32 is covered by a cover 34.

The cover 34 is a member provided openably and closably relative to the main housing 30 between the front wall portion 301 and the rear wall portion 302 and includes an upper cover part 341 and a front cover part 342. The upper cover part 341 covers the document conveying unit 32 from above. The front cover part 342 covers the document conveying unit 32 from front and moves toward and away from the upper surface of the front wall portion 301 of the main housing 30 as the cover 34 is opened and closed.

The document discharge tray 33 is a tray to which a document sheet is discharged after a document image thereof is optically read. The upper surface of the low-level part on the right side of the main housing 30 serves as the document discharge tray 33.

The automatic document feeder 3 further includes a display device 50. The display device 50 displays state information of the automatic document feeder 3 when the automatic document feeder 3 conveys a document sheet to the image reading position. FIG. 3 is a diagram conceptually showing the construction of the display device 50.

The display device 50 includes a light emitting unit 51, a display member 52 and a focusing member 53. The light emitting unit 51 and the focusing member 53 are provided in the main housing 30, whereas the display member 52 is provided in the cover 34.

By providing the light emitting unit 51 in the apparatus main body 2 and the display member 52 in the cover 34, light is introduced from the light emitting unit 51 to the display member 52 even if the light emitting unit 51 and the display member 52 are somewhat distant from each other. This enables the display member 52 to easily fulfill a display function.

The light emitting unit 51 includes an emission source 511 such as an LED or the like for generating light, a control board 512 on which the emission source 511 is mounted and which controls the emission source 511, and wiring 513 for electrically connecting the control board 512 and a sensor 54. The sensor 54 detects state information of the automatic document feeder 3 and, for example, detects whether or not a document sheet has been set on the document feed tray 31.

The control board 512 controls the emission source 511 and causes it to emit light when the state information is detected by the sensor 54. The wiring 513 transmits a sensor signal from the sensor 54 to the control board 512. Note that the state information is not limited to the presence or absence of a set document sheet, but may be the presence or absence of a jam of a document sheet to be notified to the user.

The display member 52 emits light from the emission source 511 to the outside. The user recognizes the state information by seeing the emitted light. The structure of the display member 52 is described in detail later.

The focusing member 53 is a transparent or semitransparent lens shaped to be able to focus light L of the emission source 511 and introduce the light L to the display member 52. Since the light emitting unit 51 is provided in the main housing 30 and the display member 52 is provided in the cover 34 as described above, the emission source 511 of the light emitting unit 51 and an incident portion 521 (see FIG. 7) of the display member 52 to be described later are somewhat distant from each other in a propagation direction of the light L. However, the light L can be introduced to the display member 52 by the focusing member 53. The focusing member 53 is preferably a lens having an aspherical surface shape. By setting the lens to have the aspherical surface shape, the light L can be easily introduced to the incident portion 521 of the display member 52.

Further, the focusing member 53 is a lens having a filter function of filtering a predetermined color in the light L and interchangeably provided. Thus, the display member 52 can emit a specific color, e.g. a color preferred by the user from a display area 522 (see FIG. 6) to be described later. In this way, the design of the display area 522 can be improved and the user can more easily recognize the light L. Further, since the lens is interchangeably provided, it can be easily replaced by a lens having a filter function of filtering another color.

Figure 4:
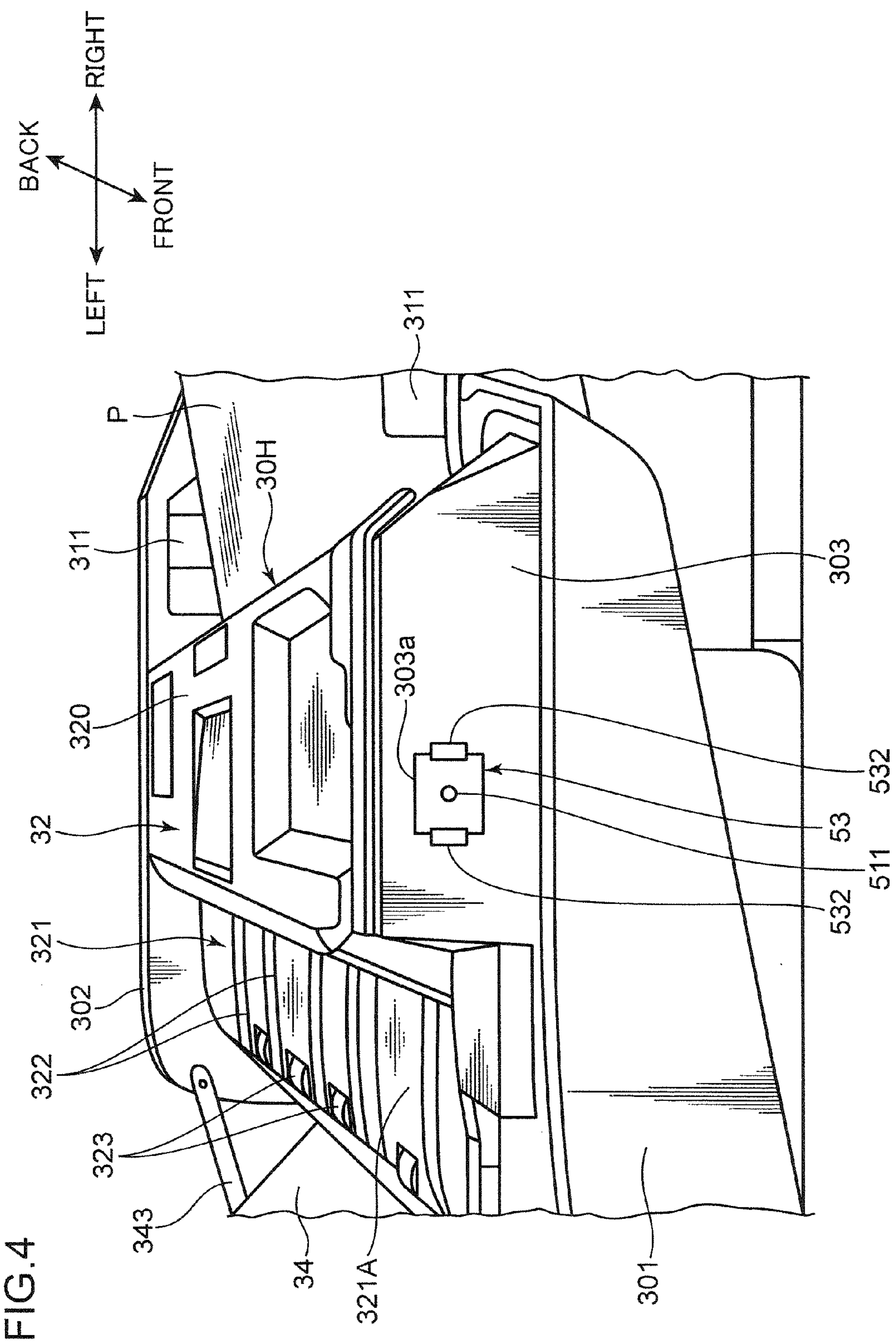
FIG. 4 is a perspective view showing an open state of a cover and a state where a focusing member of the display device is mounted on a main housing.

FIG. 4 is a perspective view showing an open state of the cover 34 and a state where the focusing member 53 is mounted on the main housing 30. The cover 34 is openable and closable relative to the document conveying unit 32 by a hinge 343 coupling the rear wall portion 302 of the main housing 30 and the cover 34. When the cover 34 is opened as shown in FIG. 4, a conveying main body 320 and a conveyance path 321 of the document conveying unit 32 are exposed to the outside. The conveying main body 320 includes unillustrated pickup roller and feed roller, and a document sheet P placed on the document feed tray 31 is fed from the feed opening 30H to the conveyance path 321 by the pickup roller and the feed roller. The conveyance path 321 is defined between a first guide surface 321A of the main housing 30 and a second guide surface 321B (see FIG. 5) of the cover 34. The first guide surface 321A is formed with guide ribs 322 and has conveyor rollers 323 arranged therein to smoothly convey the document sheet P.

The focusing member 53 is mounted on a mount wall 303 projecting upward from the upper surface of the front wall portion 301 of the main housing 30. The mount wall 303 is exposed to the outside when the cover 34 is opened, and the conveying main body 320 is arranged between the mount wall 303 and the rear wall portion 302. An opening 303*a* corresponding to the shape of the focusing member 53 is formed in the front surface of the mount wall 303, and the focusing member 53 has opposite lateral portions held by holding members 532 after being fitted into the opening 303*a*. The emission source 511 of the light emitting unit 51 is provided in the mount wall 303 or the conveying main body 320 at a position facing the focusing member 53. The control board 512 is also provided in the mount wall 303 or the conveying main body 320. Although not shown in FIG. 4, the sensor 54 is provided in the conveying main body 320 and the wiring 513 (FIG. 3) is arranged between the sensor 54 and the control board 512 behind the mount wall 303. Thus, the wiring 513 is not exposed to the outside as is clear from FIG. 4 even if the cover 34 is opened.

Figure 5:
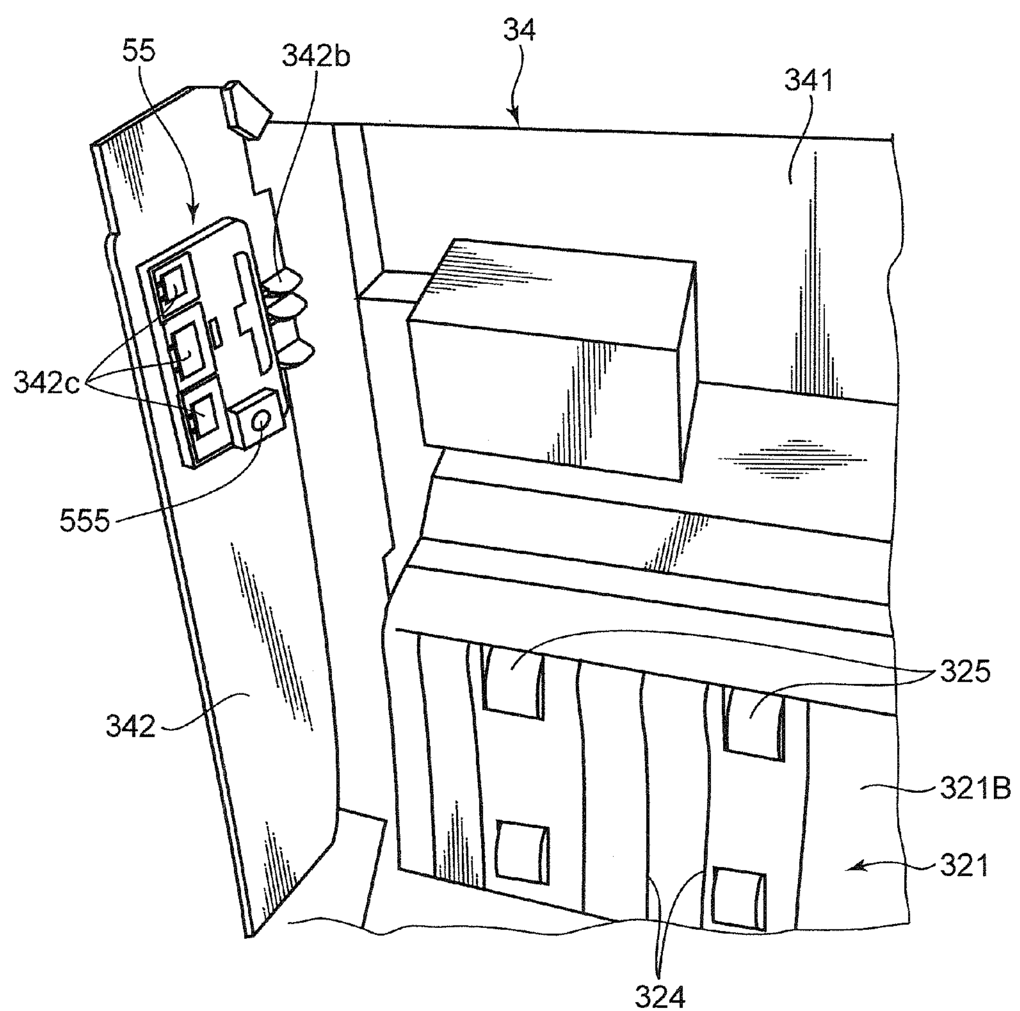
FIG. 5 is a perspective view showing a state where a display member is mounted on the cover.

FIG. 5 is a perspective view showing the open state of the cover 34 and a state where the display member 52 is mounted on the cover 34. As described above, the cover 34 includes the upper cover part 341 and the front cover part 342. The underside of the upper cover part 341 serves as the second guide surface 321B of the conveyance path 321. The second guide surface 321B is formed with guide ribs 324 and has conveyor rollers 325 arranged therein to smoothly convey the document sheet.

The display member 52 is held on the front cover part 342 by a holding member 55. Since the holding member 55 holds the display member 52 on a first holding surface 552 (see FIG. 10) facing the underside of the front cover part 342, the display member 52 cannot be seen in FIG. 5. The holding member 55 includes an incident hole 555. The incident hole 555 is formed at a position facing the emission source 511 via the focusing member 53. Light from the emission source 511 is focused by the focusing member 53 and incident on the incident hole 555. The light incident on the incident hole 555 propagates to the display member 52. The structure of the holding member 55 is described in detail later.

Figure 6:
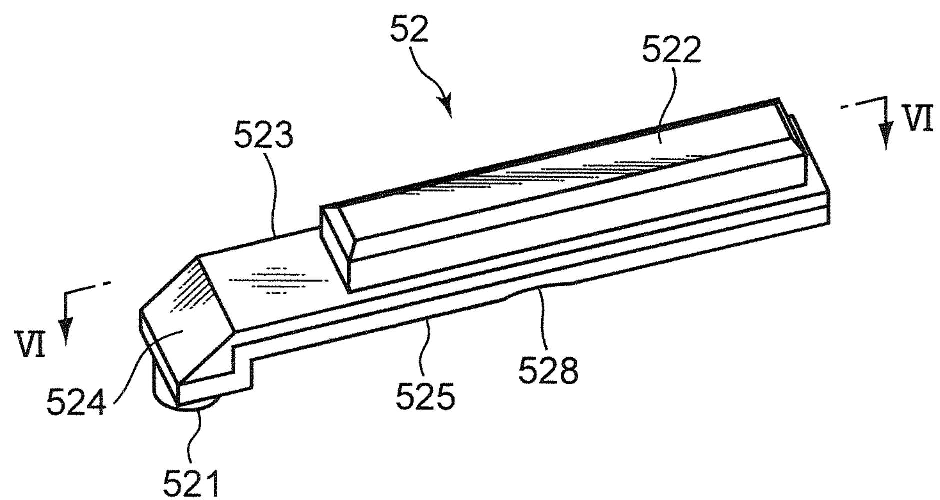
FIG. 6 is a perspective view showing the display member when viewed from one side.
Figure 7:
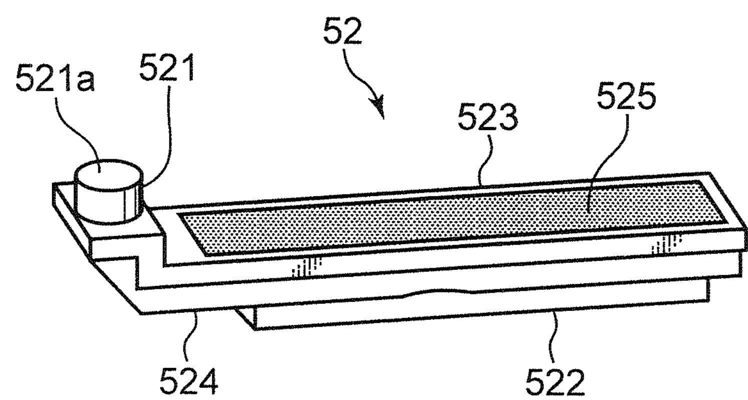
FIG. 7 is a perspective view showing the display member when view from the other side.
Figure 8:
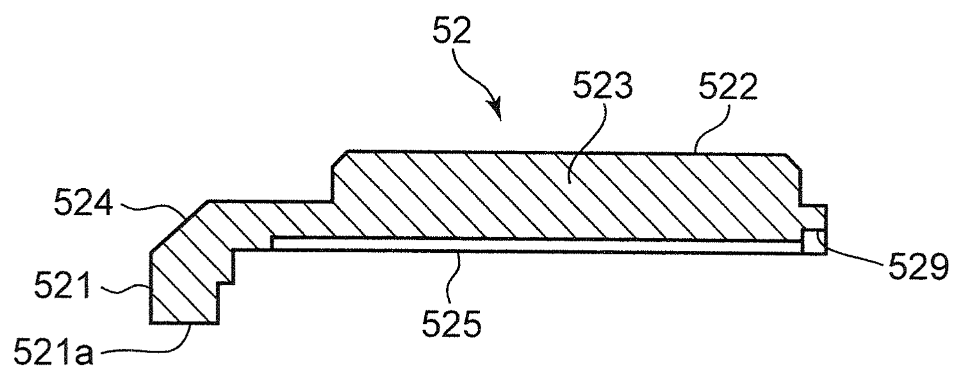
FIG. 8 is a sectional view along line VI-VI of FIG. 6.
Figure 9:
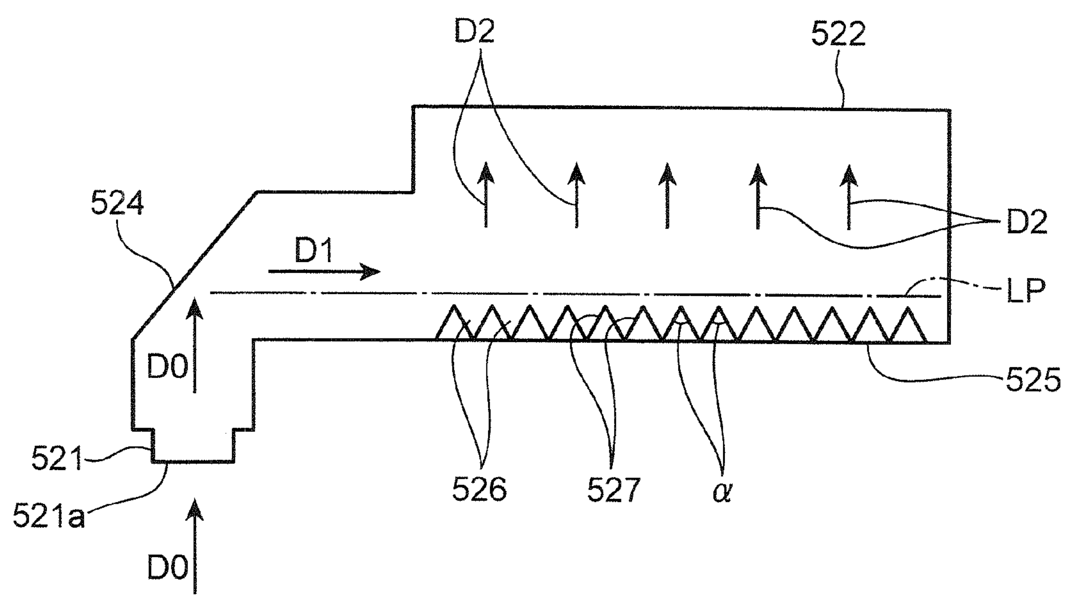
FIG. 9 is a diagram of FIG. 8 showing a light propagation direction in the display member.

Next, the display member 52 is described with reference to FIGS. 6 to 9. FIG. 6 is a perspective view showing the display member 52 when viewed from one side. FIG. 7 is a perspective view showing the display member 52 when view from the other side. FIG. 8 is a sectional view along line VI-VI of FIG. 6. FIG. 9 is a diagram of FIG. 8 showing a light propagation direction in the display member 52.

The display member 52 is a molded resin lens integrally including the incident portion 521, the display area 522 and a light guide portion 523.

The incident portion 521 has a cylindrical shape and includes an incident surface 521*a* facing the emission source 511. The incident surface 521*a* of the incident portion 521 and the incident hole 555 of the holding member 55 are located on an optical axis of light from the emission source 511. The light from the emission source 511 passes through the incident hole 555 to be incident on the incident surface 521*a*.

The display area 522 is a light output portion for outputting the light incident on the incident surface 521*a* to the outside. The display area 522 is lighted by light emission and the user recognizes the state information by seeing the lighting. The display area 522 is a long and narrow area extending on a plane substantially perpendicular to an incident direction D0 in which the light is incident on the incident surface 521*a*.

The light guide portion 523 is a long and narrow part for guiding the light incident on the incident surface 521*a* to the display area 522, and includes a polarization surface 524 and a light guide path LP. The polarization surface 524 is formed at a position facing the incident surface 521*a* when viewed in the incident direction D0. The polarization surface 524 polarizes the light incident on the incident surface 521*a* in a direction (hereinafter, referred to as a first direction D1) substantially perpendicular to the incident direction D0. An angle of the polarization surface 524 is about 45°. The light guide path LP extends along the first direction D1 and guides the light polarized by the polarization surface 524 in the first direction D1. The light guide path LP extends substantially in parallel to the display area 522.

The display member 52 further includes a diffusing portion (also called diffuser). The diffusing portion introduces the light guided by the light guide path LP to the display area 522 while diffusing it. The light guide portion 523 includes a facing surface 525 facing the display area 522. The light guide path LP is a light path defined between the display area 522 and the facing surface 525. In this embodiment, the facing surface 525 is formed to be an irregular surface, and the irregular surface 525 forms the diffusing portion.

According to this construction, the light guided by the light guide portion is introduced to the light output portion 522 while being diffused by the diffusing portion 525. Thus, the light output from the light output portion 522 can be more easily recognized. In this way, display performance of the display member 52 is improved.

The irregular surface 525 includes a multitude of groove portions 526 adjacent in the first direction D1. The irregular shape of the irregular shape 525, i.e. the shape and arrangement of the respective groove portions 526, is set to be able to guide the light in a second direction D2 substantially perpendicular to the first direction D1 and diffuse the light substantially over the entire display area 522. For example, a convex part 527 between one groove portion 526 and the other groove portion 526 adjacent on the irregular surface 525 is set to have an apex angle $\alpha$ in the range of 10° to 75°. Since the irregular surface 525 diffuses the light while guiding the light, which is propagating in the first direction D1, in the second direction D2, the light can be more efficiently diffused as compared with a construction in which light propagates merely in the first direction D1. A structure for setting the apex angle $\alpha$ of the convex parts 527 between the groove portions 526 in the range of 10° to 75° can be easily formed, and the light can be easily and efficiently diffused in the second direction D2 by such angle setting.

According to this construction, the irregular surface as the diffusing portion 525 guides and diffuses the light in the second direction D2 perpendicular to the first direction D1 by characteristics of the irregular shape thereof, wherefore the light can be more efficiently diffused as compared with the construction in which light propagates merely in the first direction D1.

In the display member 52 constructed as described above, light from the emission source 511 is first focused by the focusing member 53 and guided to the incident hole 555 of the holding member 55. The light passes through the incident hole 555 of the holding member 55 to be incident on the incident surface 521*a* of the incident portion 521. The light propagating in the incident direction D0 is polarized in the first direction D1 substantially perpendicular to the incident direction D0 by the polarization surface 524 of the light guide portion 523. Then, the light polarized in the first direction D1 is polarized while being diffused from the first direction D1 to the second direction D2 substantially perpendicular to the first direction D1. The light polarized in the second direction D2 is diffused substantially over the entire display area 522 and output to the outside from the display area 522 in a diffused state. In this way, the quantity of the light output from the display area 522 is increased and the light output from the display area 522 is more easily recognized by the user. By using the irregular surface 525 in this way, display performance of the display member 52 is improved. Further, since the light is incident on the incident surface 521*a* while being focused by the focusing member 53, a predetermined quantity of light is guided to the light guide portion 523. This enables the display member 52 to easily fulfill a display function.

Figure 10:
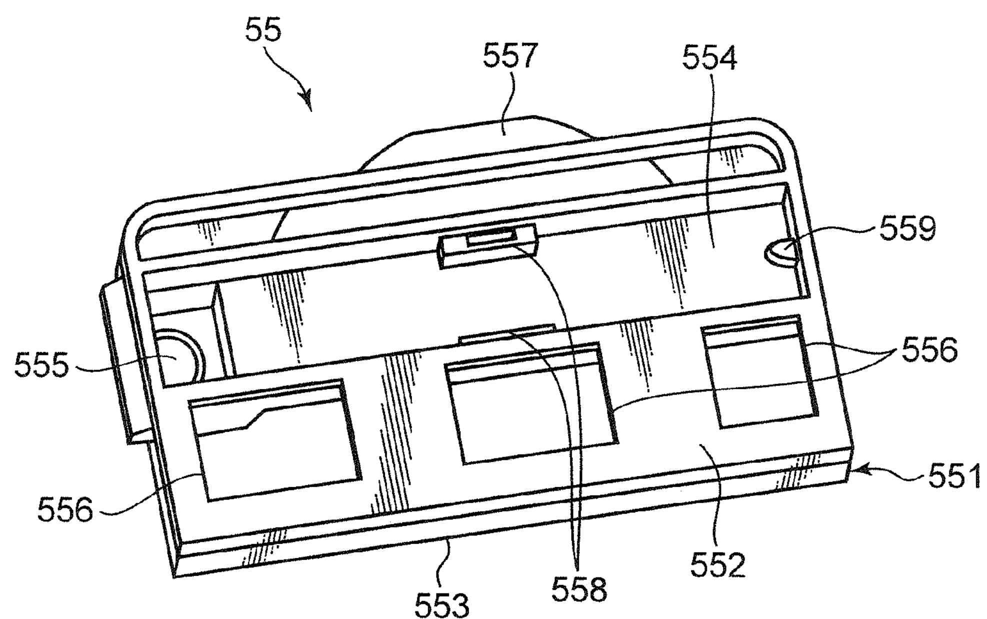
FIG. 10 is a perspective view of a holding member when viewed from a side of a first holding surface thereof.
Figure 11:
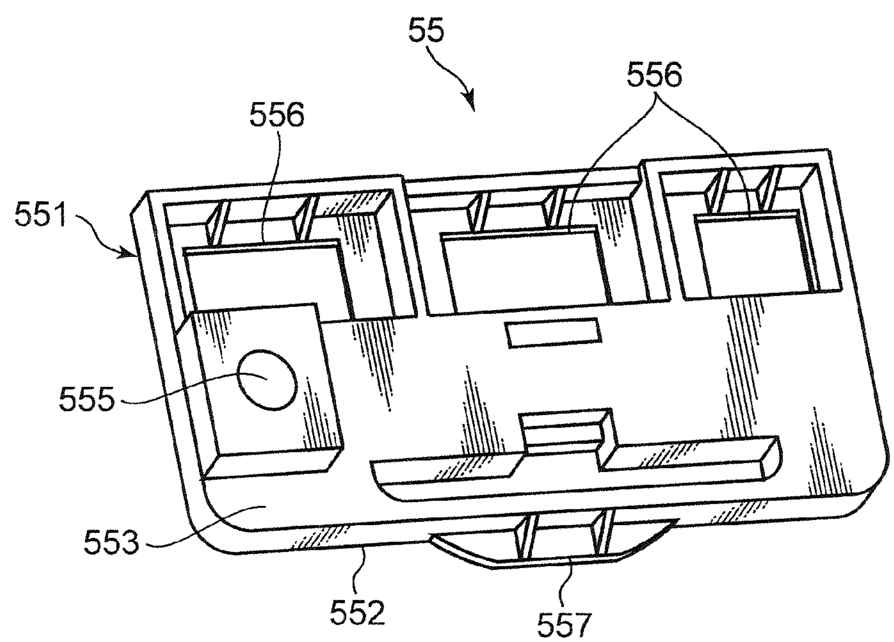
FIG. 11 is a perspective view of the holding member when viewed from a side of a second holding surface thereof.

Next, the holding member 55 for holding the display member 52 is described with reference to FIGS. 10 and 11. FIG. 10 is a perspective view of the holding member 55 when viewed from a side of the first holding surface 552 thereof. FIG. 11 is a perspective view of the holding member 55 when viewed from a side of a second holding surface 523 thereof. As described above, the holding member 55 is a member for holding the display member 52 on the underside of the front cover part 342 of the cover 34, and includes a rectangular main body 551. The main body 551 includes the first holding surface 552 facing the underside of the front cover part 342 and the second holding surface 553 located at a side opposite to the first holding surface 552 and facing the mount wall 303 when the cover 34 is closed. Note that the front cover part 342 is formed with an opening 342*a* (see FIG. 2) corresponding to the shape of the display area 522 of the display member 52, and the display area 522 is facing the outside through the opening 342*a* with the display member 52 held on the front cover part 342.

The first holding surface 552 is formed with an accommodating groove 554. The accommodating groove 554 is a groove extending in a longitudinal direction of the main body 551 and shaped to be able to accommodate the incident portion 521 and the light guide portion 523 of the display member 52. The above incident hole 555 is formed in one end of the accommodating groove 554. The light guide portion 523 is accommodated in the accommodating groove 554 with the facing surface 525 held in contact with the bottom of the accommodating groove 554. A pair of positioning pieces 558 projecting in directions perpendicular to an extension direction of the accommodating groove 554 and opposite to each other are formed in the accommodating groove 554. In the accommodating groove 554, a positioning projection 559 is formed at an end opposite to the end where the incident hole 555 is formed. On the other hand, the light guide portion 523 includes first recesses 528 formed in opposite side walls extending in the longitudinal direction and a second recess 529 formed in the bottom surface of an end opposite to an end where the polarization surface 524 is formed. By fitting the positioning pieces 558 into the first recesses 528 of the light guide portion 523 and fitting the projection 559 into the second recess 529, the light guide portion 523 and the incident portion 521 can be accommodated in the accommodating groove 554 while being positioned.

The main body 551 includes a locking piece 557 extending in a direction substantially perpendicular to the longitudinal direction from a lateral edge extending in the longitudinal direction and three locking holes 556 adjacent in the longitudinal direction near the accommodating groove 554. First locking portions 342*b* with which the locking piece 557 can be engaged and second locking portions 342*c* fittable into the locking holes 556 are formed on the underside of the front cover part 342 of the cover 34. By engaging the locking piece 557 of the main body 551 with the first locking portions 342*b* and fitting the second locking portions 342*c* into the locking holes 556 after the light guide portion 523 and the incident portion 521 of the display member 52 are accommodated into the accommodating groove 554, the display member 52 is held on the underside of the front cover part 342 with the display area 522 of the display member 52 located in the opening 342*a*.

In the automatic document feeder 3 of the image forming apparatus 1 according to this embodiment described above, the light emitting unit 51 of the display device 50 is provided in the main housing 30 and the cover 34 openable and closable relative to the main housing 30 is provided with the display member 52 of the display device 50. That is, the control board 512 of the light emitting unit 51 is provided in the main housing 30 (in this embodiment, in the mount wall 303 or the conveying main body 320). Thus, the wiring 513 electrically connected to the control board 512 is not arranged between the main housing 30 and the cover 34. In this embodiment, the wiring 513 is arranged between the sensor 54 and the control board 512 behind the mount wall 303. Accordingly, the wiring 513 is not exposed to the outside as is clear from FIG. 4 even if the cover 34 is opened. In this way, even if a problem such as a jam occurs in the document conveying unit 32 provided in the main housing 30 and the cover 34 is opened and closed to solve this problem, it is prevented that the wiring 513 is caught by the cover 34, consequently that the wiring 513 is damaged. Therefore, the emission source 511 is appropriately controlled and light of the emission source 511 is output to the outside from the display area 522. As a result, the display member 52 can fulfill the display function and the user can recognize the state information.

This application is based on Japanese Patent Application Serial No. 2011-031104 filed with the Japan Patent Office on Feb. 16, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus comprising:

an apparatus main body for performing a predetermined process on a sheet;

a cover openable and closable relative to the apparatus main body;

a light emitting unit provided in the apparatus main body and including an emission source for generating light, a control board for controlling the emission source and causing the emission source to generate the light and wiring electrically connected to the control board; and a display member provided in the cover, the display member being arranged to face the emission source and including an incident portion on which the light is incident, an output portion that is a long and narrow area extending to a first direction for outputting the light to the outside, a light guide portion having a polarization surface polarizing the light incident on the incident portion and guiding the light polarized by the polarization surface to the output portion and a diffuser for introducing the light guided by the light guide portion to the output portion while diffusing the light, wherein the incident portion and the polarization surface are disposed at a first end of the output portion in the first direction, the light is incident on the incident portion from the emission source in a second direction substantially perpendicular to the first direction, the polarization surface polarizes the light incident on the incident portion in the first direction, the light guide portion forms a light guide path extending along the output portion and guides the light polarized by the polarization surface in the first direction in the light guide path, the diffuser guides the light in the second direction and diffuses the light substantially over the entire output portion the cover has a holding member for holding the display member, the holding member includes:

an accommodating groove having opposite first and second ends spaced apart along the first direction and configured to accommodate the display member, an incident hole opened in the first end of the accommodating groove and through which the light incident on the incident portion passes, two opposed positioning pieces formed in the accommodating groove and projecting in directions perpendicular to the first and second directions, a positioning projection formed at the second end of the accommodating groove, the light guide portion of the display member includes two opposite sidewalls extending in the first direction and a first recess being formed in each of the opposite sidewalls, the light guide portion further includes a second recess in a part of the light guide portion opposite to the first end where the polarization surface is formed in the first direction, the display member is accommodated in the accommodating groove by fitting the positioning pieces respectively into the first recesses and fitting the positioning projection into the second recess, thereby positioning the light guide portion and the incident portion.

2. An image forming apparatus according to claim 1, further comprising a focusing member provided in the apparatus main body and adapted to focus the light generated from the emission source toward the display member.

3. An image forming apparatus according to claim 1, wherein:

the diffuser has an irregular shape and is formed by an irregular surface facing the output portion.

4. An image forming apparatus according to claim 3, wherein:

the light guide portion includes a facing surface facing the output portion;

the light guide path is a light path defined between the output portion and the facing surface; and the facing surface is the irregular surface.

5. An image forming apparatus according to claim 4, wherein:

the irregular surface includes a multitude of groove portions adjacent along the first direction; and a convex part between one groove portion and another groove portion adjacent to each other has an apex angle in the range of 10° to 75°.

6. An image forming apparatus according to claim 2, wherein:

the focusing member is a lens having an aspherical surface shape; and the aspherical surface shape is set to be able to focus the light toward the display member.

7. An image forming apparatus according to claim 6, wherein:

the lens has a filter function of filtering a predetermined color and can be removed and interchanged with a different lens having a different filter function for filtering a different predetermined color.

8. An image forming apparatus according to claim 1, wherein:

the apparatus main body has a housing for housing mechanisms provided in the apparatus main body;

the cover is openable and closable relative to the housing; and the light emitting unit is provided in the housing.

* * * * *